United States Patent [19]
Dumont, Jr.

[11] 3,767,316
[45] Oct. 23, 1973

[54] LINE BORING BAR ASSEMBLY
[76] Inventor: Walter M. Dumont, Jr., 2919 William's St., Muskogee, Okla. 74401
[22] Filed: Sept. 20, 1972
[21] Appl. No.: 290,540

[52] U.S. Cl. .................. 408/79, 408/82, 408/83, 408/115
[51] Int. Cl. ............................................ B23b 41/12
[58] Field of Search .................. 408/42, 79, 72, 4, 408/54, 80, 82, 83, 114, 115

[56] References Cited
UNITED STATES PATENTS
1,434,004   10/1922   Greven .......................... 408/115 X
2,401,838   6/1946    Mitchell .......................... 408/72 X
2,439,492   4/1948    Sharratt .......................... 408/114 X
2,964,978   12/1960   Alafouzos ........................ 408/79

Primary Examiner—Leonidas Vlachos
Attorney—Ralph E. Zimmerman

[57] ABSTRACT

Apparatus for line boring the bearing surfaces in an automobile engine block including means to accurately mount the said apparatus onto an engine block, means to accurately bore the main and reface the thrust bearing surfaces; automatic planetary transmission means for screw feeding the cutting heads mounted on the line boring bar at a constant speed during the boring, and means to rotate the said boring bar carrying the said cutting heads.

7 Claims, 7 Drawing Figures

LINE BORING BAR ASSEMBLY

BACKGROUND OF THE INVENTION

In the operation of rebuilding automotive engines, it has been found that the present tools available for reboring main and refacing thrust bearing surfaces do not accurately align the boring tools with the bearing surface each with each other especially in a Volkswagon engine. In order to reduce the vibration in the running motor and reduce the amount of uneven wear due to misalignment of the boring tool with the bearing surfaces, I have invented a line boring bar assembly which is readily adaptable for boring the surfaces of both the thrust and main bearings. It has been found that my apparatus is adaptable for mounting to the block structure of the automobile engine with the exact alignment of the cutting heads for resurfacing the main and thrust bearing surfaces.

The main object of this invention is to disclose apparatus suitable for accurately line boring the main and thrust bearing surfaces in an automotive engine.

Another object of this invention is to disclose apparatus for accurately setting the cutting blades on the line boring bar.

Still another object of this invention is to disclose a method of resurfacing both main and thrust bearing surfaces in an automotive engine block.

SUMMARY OF THE INVENTION

DESCRIPTION

Figure 1:
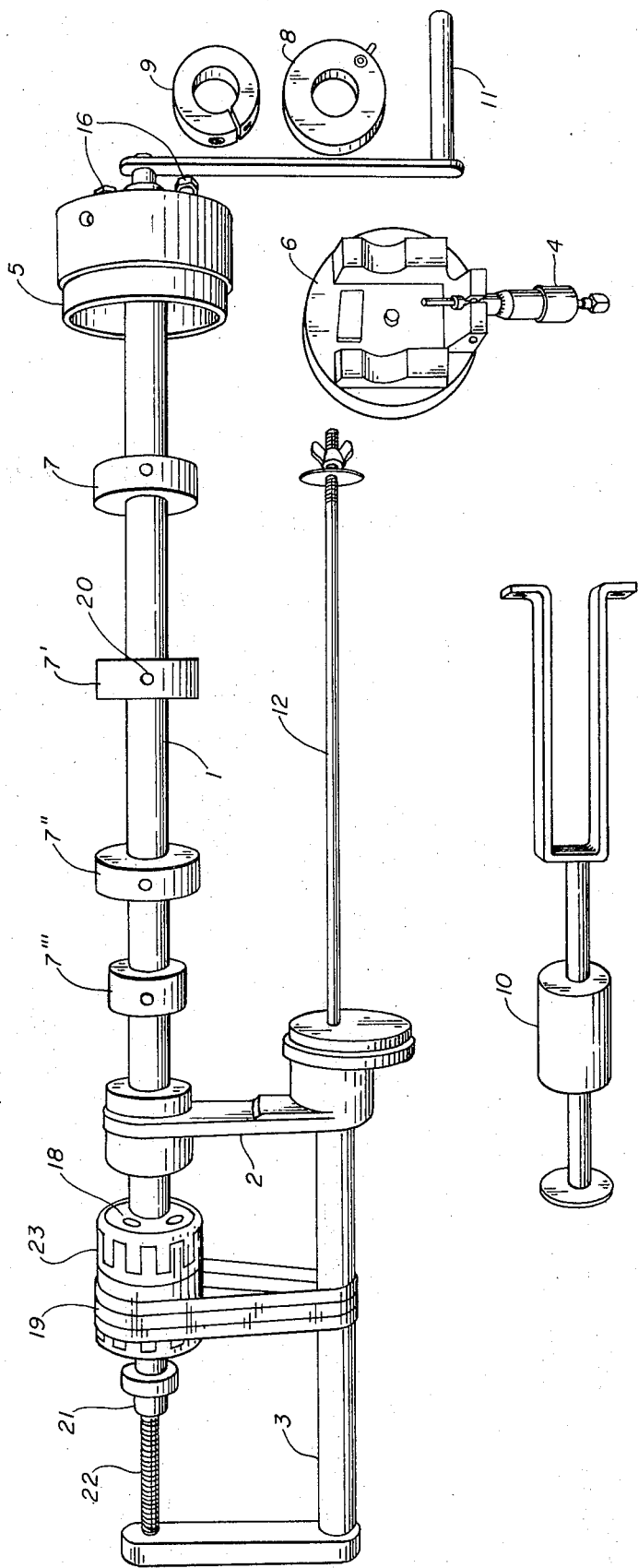
FIG. 1 is a top view showing the line boring assembly with micrometer means to set the cutting heads.

Referring now to FIG. 1 which shows the line boring bar in assembly. The automotive planetary gear screw feed 23 which is a 1–7 reduction automatically moves cutting heads 7, 7', 7'', 7''', mounted on boring bar 1 across the bearing surface in the engine block 13, FIG. 2. Boring bar 1 with cutting heads 7, 7', 7'', 7''' is supported by centering ring 5 mounted on the engine block at position 14, FIG. 2. The other end of the boring bar 1 is supported in the engine block by dog leg 2, FIGS. 1 and 2, which is mounted on the opposite end of the motor block 13 in an opening at position 15. At position 15 attached to the lower end of dog leg 2 which is supported in the engine block 13 is rod 12 (FIGS. 16) which extends throughout the motor block assembly 13 and is secured at the other end of the engine block assembly 13 by a washer and a wing nut mounted on rod 12. (See FIG. 2). Planetary gear automatic feeding means 23 FIG. 1 is shown attached to the boring bar by mounting plate 18. (FIGS. 1 and 3). The planetary gear feeding means 23 is supported in cradle 3. (FIGS. 1 – 6). Cradle 3 is connected to the lower section of dog leg 2 at position 15 FIG. 3, which in turn is supported by rod 12 bolted through the motor block 13. Planetary gear feeding means 23 which has two separately moving section is held partially stationary be elastic bands 19 (FIGS. 2 and 3) which causes the rotating boring bar 1 with cutters heads 7, 7', 7'', 7''' mounted on boring rod 1 to move across the surface of the main bearing surfaces at constant speed located beneath the cutter heads 7, 7', 7'', 7''' in the motor block 13. (See FIG. 2). The boring bar 1 is manually rotated by handle 11 which is attached to the end of the boring rod 1. (See FIG. 2).

Each of the cutting heads 7, 7', 7'' and 7''' is secured to the boring rod by set screws (not shown), carbide cutters for example 20, which are set in the cutting heads 7, 7', 7'', and 7''' are adjusted by placing the boring bar 1 with cutting heads 7, 7', 7'', and 7''' respectively in the groove of micrometer stand 6, FIG. 1, the micrometer being useful to gauge the cutting heads 7, 7', 7'', 7''' to the desired bore size of the bearings. This is done by adjusting the cutters to cut the correct size bore opening.

Item 8, FIG. 1, is a radial (thrust) cutting head. Item 9, FIG. 1, is a split set collar, the utility of which shall be explained later. The sliding knocker 10, FIG. 3, is useful for properly seating the centering ring 5 into position on the motor block 13, FIG. 3. The sliding knocker 10 is bolted to the centering ring 5 at bolts 16, FIG. 3a.

Figure 4:
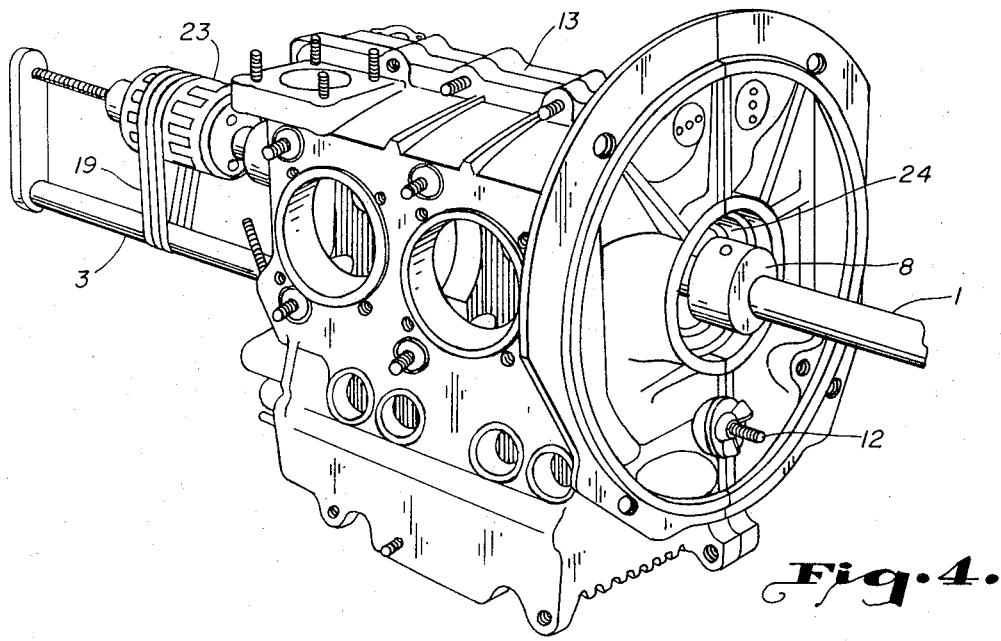
FIG. 4 is a perspective drawing showing the radial (thrust) bearing encasement with the radial (thrust) bearing cutting head in cutting position.
Figure 5:
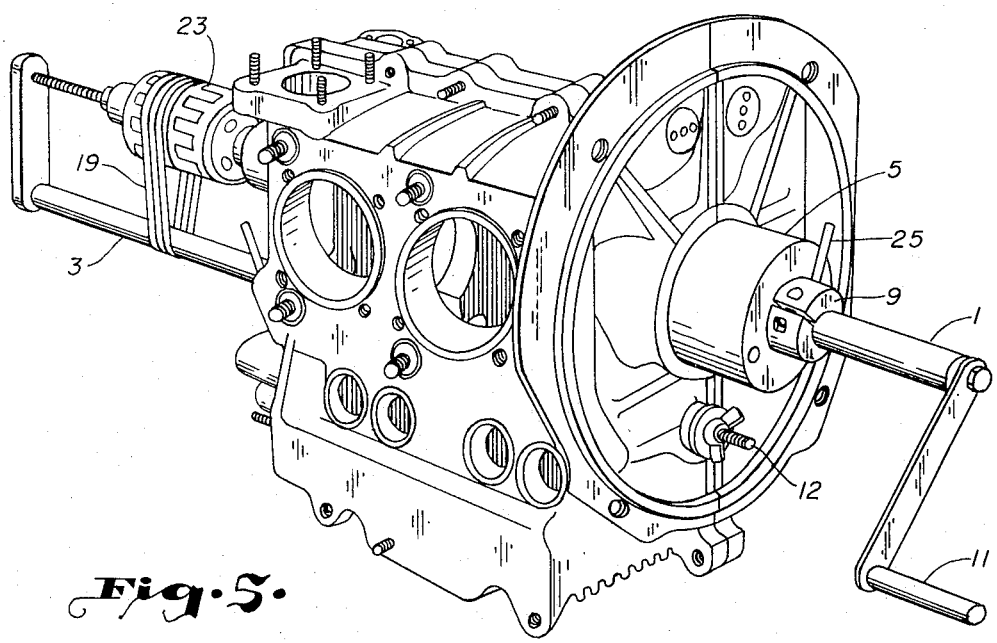
FIG. 5 is a perspective drawing showing the boring bar in complete assembly for resurfacing the radial (thrust) bearing surface area.
Figure 6:
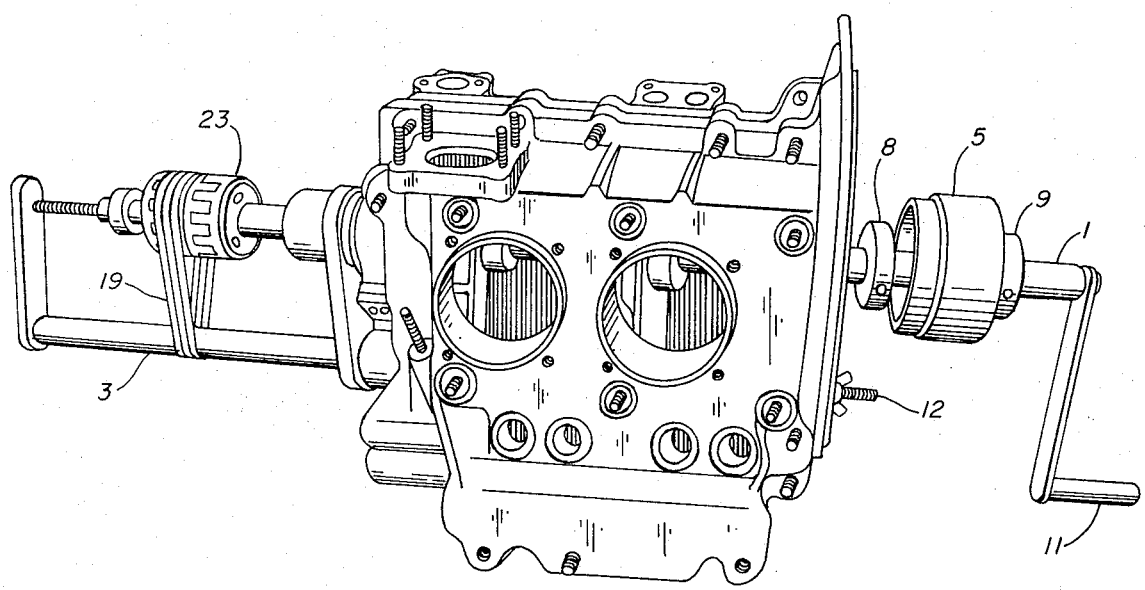
FIG. 6 is a perspective drawing showing the position of the radial (thrust) cutting head, the centering ring and the split set collar on the line boring bar assembled in an engine block.

The boring bar assembly which I have disclosed herein has dual utility not only will it be useful in properly boring bearing surfaces, but it also has utility in properly facing the radial bearing surface, as shown in FIGS. 4, 5, and 6. FIG. 4 portrays the position of the radial bearing surface cutting head 8 in position on the radial (thrust) bearing surface 24. FIG. 6 shows the relationship of positioning of the radial surface cutting head 8, centering ring 5 and split ring 9 on boring bar 1 FIG. 4, 5, and 6 in the boring bar assembly, FIG. 1.

OPERATION

To obtain accurate results in using the boring bar disclosed herein, the boring bar 1 with cutting heads, 7, 7', 7'', 7''' attached must be set to the specific bore opening desired. This is accomplished by placing the bar 1 with the cutting heads 7, 7', 7'', and 7''' in position in the micrometer stand 6. The micrometer (4) reading is then set to the setting desired. For instance to bore 0.020 oversize, the setting would be 900; 0.040 oversize the setting would be 910, and for 0.060 oversize, the setting would be 920. When the desired setting is determined, each of the cutting heads with carbide cutters 7, 7', 7'', and 7''' are set in the micromter stand 6 FIG. 1 and adjusted to the proper cutting size.

The micrometer stand 6, FIG. 1, can best be described having a base 6 with a groove for holding the boring bar 1 with the cutting head 7, 7', 7'', and 7''' attached in a measuring position. The micrometer 4 itself, which is mounted on the side of the stand 6 is positioned so that accurate reading can be made and the carbide cutter adjusted by moving it in the slotted hole 20, FIG. 1, in the cutting heads 7,7',7'',7''', FIG. 1. the carbide cutter is held in adjustment by a set screw (not shown) in each of the respective cutting heads.

Figure 2:
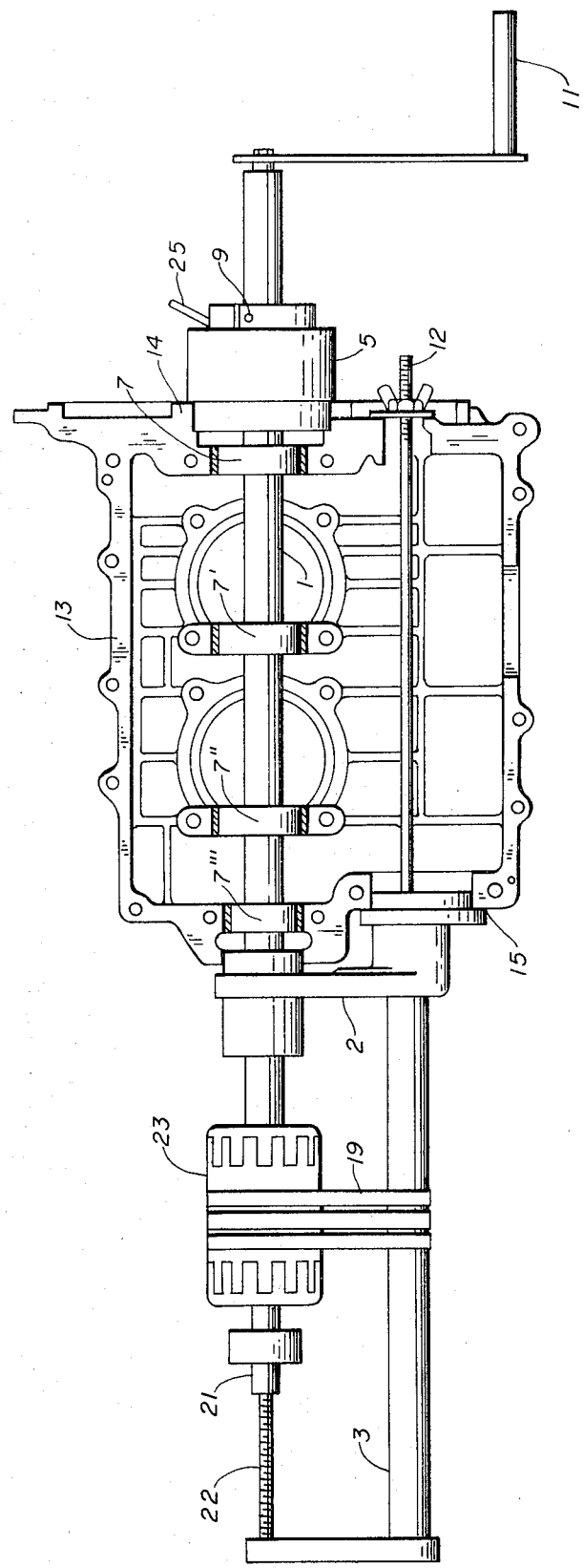
FIG. 2 is a perspective top view drawing showing the line boring assembly in operating position on an engine block with the adapter for aligning a center ring.
Figure 3:
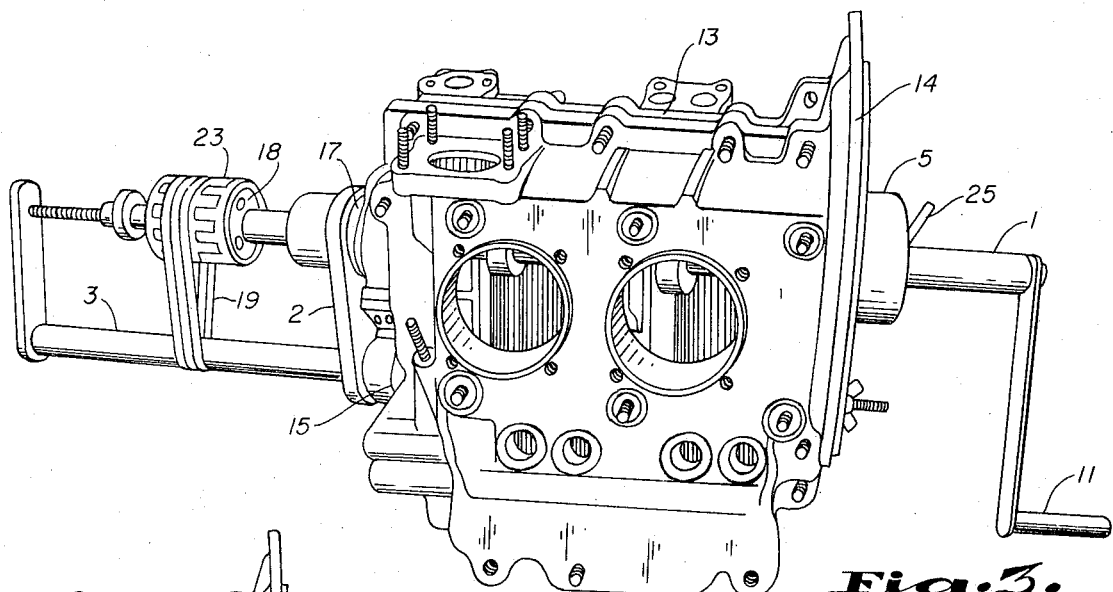
FIG. 3 is a perspective drawing looking down on the line boring machine assembled on an engine block with manual means to turn the assembly.

The boring bar 1 with the cutting heads 7,7',7'', and 7''' FIG. 1 with carbide cutter properly set is placed in cutting position in the motor block 13, FIG. 2. Dog leg 2 is placed in position as shown in FIG. 2, the lower section of dog leg 2 being secured in the oil hole opening 15 of motor block 13 by rod 12, FIG. 1 passes rod 12 through the motor block 13. Dog leg 2 is held in place by tightening the wing not over the washer on rod 12. (See FIG. 2).

Figure 3A:
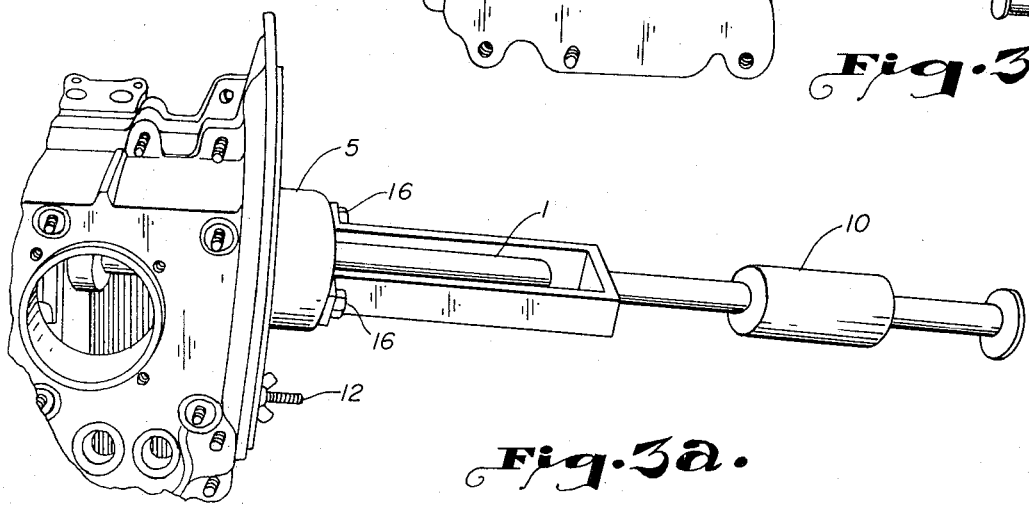
FIG. 3a is a perspective drawing showing a partial view of the engine block with the knocker attached to the centering ring of the boring bar assembly.

Cradle 3 with threaded adjustment screw 22 and adjustable nut 21 FIG. 1 and planetary feed mechanism 23 are aligned in the cradle as shown in FIG. 1. Rubber bands 19 are placed over one section of the planetary feed mechanism 23 as shown in FIG. 1. Centering ring 5, FIG. 1, is placed around the boring bar and fitted into the engine block 13 as shown in FIG. 2. Slide knocker 10 is bolted on the center ring 5 to align the center ring 5 into position as shown in FIG. 3a by gently tapping the centering ring 5 into place with knocker 10. The slide knocker 10 is removed and split collar 9 is positioned and secured around the boring bar 4 against the centering ring 5. Handle 11 is mounted on the boring bar 1 as shown in FIG. 5 for manual rotation of the boring bar 1. Handle 11 is manually rotated moving the boring bar 1 in a clockwise direction. As the boring bar 1 is rotated, the operation of the planetary feed mechanism caused the cutting heads 7,7''',7''' with carbide cutting blades to move inwardly axially across the bearing surfaces in engine block 13, FIG. 2. When the cutting heads 7,7',7'', and 7''' have completed their axially travel cutting head 7 is removed and thrust bearing surface cutting head 8 is positioned on the boring bar in the thrust bearing when seated will be properly aligned with the main bearings in the motor block 13, FIG. 4. When the thrust bearing surface cutting head 8 is placed on the boring bar 1 it is taped tightly into position by placing the centering ring 5 with the sliding knocker 10 attached thereto on the boring bar 1 as shown in FIG. 3a. The knocker 10 is gently taped four times to proper place the centering ring 5 against the thrust bearing surface cutting head 8. The knocker 10 is removed, split set collar 9 is adjusted and spaced to be taken on the bearing surface 14 from the centering ring 5 to provide for amount of cut and them secured to the boring bar 1 with a set screw. The handle 11 is rotated until the thrust cutting head 8 has moved rotatively to release the cutting head 8 from contact with the thrust bearing surface 24, FIG. 4. At this time the handle 11, the set collar 9, and the center ring 5 and the thrust bearing surface cutter 8 are removed from the boring bar 4 and the boring bar assembly removed from the motor block 13.

Although this disclosure shows manual operation, it should be understood that the boring bar assembly is adaptable to electrical drive means by adding a pulley with electrical motor means attached thereto.

I claim:

1. In a device for line boring the main and radial bearing surfaces in an engine block,
    a. a first support means positioned on one side of the said engine block for supporting and centering a cylindrical boring bar in the said engine block,
        1. the said boring bar having at least one cutting head attached thereto,
    b. a second support means for supporting the said boring bar on the opposite side of the said engine block,
        1. the said second support means being a cradle comprising a lower support member and a first and second upright support member,
        2. means mounting and attaching said cradle to the said engine block through an opening in the lower extremity of the said engine block,
        3. means rotatably mounting said line boring bar in the said two upright support members.

2. The device as claimed in claim 1 where the said first support means is a cylindrical centering ring inserted into the upper side of the said engine block.

3. The device as claimed in claim 1 where a handle is attached to the end of the boring bar to provide a means of manual rotation.

4. The device as claimed in claim wherein a planetary gear screw feed with a first and second section is attached to the end of the said boring bar, means to hold the said second section stationery while the said first section rotates.

5. The device as claimed in claim 1 wherein the said first upright support member is a dog leg with means to secure the said dog leg to the said engine block, the said dog leg having collar means for the said boring bar to rotate therein.

6. The device as claimed in claim 2 wherein the said centering ring has means for attaching a knocker for aligning the said centering ring.

7. The device as claimed in claim 2 wherein a radial bearing surface cutting head and a spacer are positioned on the boring bar within the said centering ring.

* * * * *